United States Patent [19]
Horn

[11] Patent Number: 5,560,628
[45] Date of Patent: Oct. 1, 1996

[54] TOWING ASSEMBLY

[75] Inventor: Richard H. Horn, Richmond, Ky.

[73] Assignee: Easy Towing, Inc., Richmond, Ky.

[21] Appl. No.: 372,148

[22] Filed: Jan. 13, 1995

[51] Int. Cl.$^6$ ..................................................... B60P 3/07
[52] U.S. Cl. ...................... 280/402; 280/490.1; 414/563
[58] Field of Search ............................. 280/490.1, 490.2, 280/490.3, 490.5, 402; 414/563, 463

[56] References Cited

U.S. PATENT DOCUMENTS

| | | | |
|---|---|---|---|
| 3,592,443 | 7/1971 | Budrow et al. | 254/420 |
| 4,113,272 | 9/1978 | Sebby | 280/402 |
| 4,761,015 | 8/1988 | Carr | 280/402 |
| 4,797,058 | 1/1989 | Bilas | 280/402 |
| 4,993,910 | 2/1991 | Rigg | 280/402 |
| 5,366,338 | 11/1994 | Mortensen | 280/402 X |

FOREIGN PATENT DOCUMENTS

1368206  1/1988  U.S.S.R. .................... 414/563

*Primary Examiner*—Kevin T. Hurley
*Attorney, Agent, or Firm*—Gilliam & Stockwell

[57] ABSTRACT

A towing assembly includes a mounting member fixed to the frame of a towing vehicle. The mounting member includes two support bars in spaced relation that are fixed perpendicularly to two cross bars that are in turn fixed to the frame of the towing vehicle. Both the support bars and the cross bars take the form of angle irons, with the horizontal legs of the support bars fixed to the horizontal legs of the cross bars. A motion assembly is coupled to the vertical legs of the support bars. The motion assembly comprises a first vertical tube coupled to the support bars and a second vertical tube associated with the first vertical tube for uniform vertical translation. A pair of roller assemblies facilitate the uniform vertical translation of the second tube. The roller assemblies are offset from one another both in a vertical plane and a horizontal plane. A horizontal tube is coupled to the second vertical tube and vertically translates therewith. A load bar that supports the towed vehicle is received within the horizontal tube and thus lifts the towed vehicle in response to vertical translation of the second vertical tube. The motion assembly is utilizes a motorized screw actuator that may be actuated from a remote location.

19 Claims, 6 Drawing Sheets

TOWING ASSEMBLY

TECHNICAL FIELD

The present invention relates generally to towing assemblies and, more particularly, to a powered lift towing assembly that is utilized to tow a smaller vehicle such as an automobile, behind a heavy-duty vehicle, such as a motor home or bus.

BACKGROUND OF THE INVENTION

In recent years, there has been an increase in the use of motor homes as they have become more affordable to a populace that has more leisure time to take advantage of their use. As is commonly known, motor homes are self-propelled vehicles in which are contained most of the conveniences for comfortable living.

There are many occasions when it is problematic and awkward to rely upon the motor home for all of the motive requirements. For instance, during an extended recreational venture, it is desirable to keep the motor home at a permanent location, such as a campground, and use a separate vehicle for other transportation needs.

While a separate vehicle may be driven to the recreational site along with the motor home, this also presents inconvenience and inefficiency. Furthermore, the driving of a separate vehicle defeats the purpose of the motor home which is intended to allow the entire family to travel together in one transportation unit.

There have been previous attempts to design towing assemblies that allow an automobile to be towed behind a motor home. One such design is disclosed in U.S. Pat. No. 4,993,910 to Rigg. The Rigg design includes a load bar pivotally attached to a cross member fixed to the chassis of the motor home. The load bar is mounted for rotation in a vertical arc underneath the motor home. An extension bar is telescopingly received within the load bar and is coupled to the proximal end of the towed vehicle. The load bar/extension bar assembly may thus be upwardly rotated about the pivot axis defined by the cross member attached to the motor home to lift the proximal end of the towed vehicle to a position for towing.

Although the Rigg and similar designs satisfy their functional purpose, they do have drawbacks. The load represented by the towed vehicle is a significant distance from the pivot axis of the load bar. This tends to reduce the stability of the towing operation. Furthermore, there is always the need to ensure when driving that a component situated below the motor home is held in a raised position. This requires reliance on extraneous locking mechanisms and may involve having to crawl underneath the motor home.

A need is thus identified to provide a towing assembly that eliminates the disadvantages of the prior art. It is desired to provide a towing assembly that provides increase stability for towing by eliminating all moving components situated underneath the motor home. It is further desirable to have a towing assembly that is easy to operate in its functional environment. The present invention is designed to satisfy these goals.

SUMMARY OF THE INVENTION

It is, therefore, a primary object of the present invention to provide a towing assembly that enhances the stability of the towing operation by maintaining the moving components of the towing assembly away from underneath the towing vehicle.

It is another object of the present invention to provide a towing assembly that is rigidly fixed to the frame off the towing vehicle.

It is still another object of the present invention to provide a towing assembly with powered lift capability.

Yet another object of the present invention is to provide a towing assembly in which the towed vehicle is lifted by uniform vertical translation of the moving components.

It is a further object of the present invention to provide a towing assembly whose moving components are easily accessible for maintenance and repair.

An additional object of the present invention is to provide a towing assembly in which the lift operation of the towed vehicle may be initiated from a remote location.

Still another object of the present invention is to provide a towing assembly whose fixed components may be incorporated into a towing vehicle during original manufacture or can be later retrofit to the towing vehicle.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel towing assembly is provided. The inventive towing assembly is particularly suited for towing a smaller vehicle, such as an automobile, behind a heavy-duty vehicle, such as a motor home or bus.

The towing assembly includes a mounting member that is fixed to the frame of a towing vehicle. A motion assembly operable with uniform vertical translation is coupled to the mounting member. A load bar is associated with the motion assembly and supports a towed vehicle in such a manner that vertical movement produced by the motion assembly raises the towed vehicle for towing.

The mounting member preferably comprises a cross bar fixed to the frame of the towing vehicle. The cross bar is most desirably positioned to extend laterally across the frame of the towing vehicle and is received within opposing channels of the frame. A support bar is fixed, at its proximal end, in perpendicular relation to the cross bar. The motion assembly is coupled to the distal end of the support bar.

The preferred embodiment of the invention includes two support bars in spaced relation. The motion assembly is coupled to and between the support bars. With this design, the motion assembly is mounted behind the towing vehicle and, thus, there are no moving components situated underneath the towing vehicle.

The support bars are preferably each defined by a horizontal leg and a vertical leg. With this configuration, the motion assembly is coupled to the vertical legs of the spaced support bars. In addition, the horizontal legs of the support bars are fixed to the cross bar.

The preferred design of the invention also includes two cross bars in spaced relation. The cross bars are also preferably defined by a horizontal leg and a vertical leg. In the particular preferred design as stated above, the support bar is fixed to the horizontal legs of the cross bars.

The motion assembly of the inventive towing assembly desirably comprises a first vertical tube coupled to the mounting member and a second vertical tube that is associated with the first vertical tube for uniform vertical translation. The preferred embodiment further includes a horizontal tube that is fixed to the second vertical tube so as to vertically translate therewith. The load bar is telescopingly received within the horizontal tube and thus vertically translates as a result of the movement of the second vertical tube.

In order to facilitate the uniform vertical translation of the second vertical tube, a roller assembly is furnished to cooperatively direct movement. The particular preferred design of the invention has a first roller assembly coupled to the first vertical tube and a second roller assembly coupled to the second vertical tube. In this preferred design, the first and second roller assemblies are offset from one another both in a vertical plane and in a horizontal plane.

The inventive design also desirably includes means for selectively locking the first and second vertical tubes against relative movement. In this manner, the second vertical tube is held in the retracted position with respect to the first vertical tube when the towing vehicle is driven at times other than when performing a towing function.

In a key aspect of the present invention, the motion assembly is desirably operated by powered means. In the preferred form of the invention, the motion assembly comprises a screw actuator. More particularly, the inventive towing assembly utilizes a screw actuator driven by a prime mover, such as a motor. This feature desirably eliminates the aggravation and strain associated with applying manual force for lifting the towed vehicle.

To further enhance the safe operation of the inventive towing assembly, means may be provided to energize the prime mover from a remote location to actuate the motion assembly. In the preferred embodiment, a switch that is controllable from a position away from the motorized screw actuator is utilized. With this aspect of the invention, there is no need to be near the motion assembly during operation.

Still other objects of the present invention will become apparent to those skilled in this art from the following description wherein there is shown and described a preferred embodiment of this invention, simply by way of illustration of one of the modes best suited to carry out the invention. As will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing.

Reference will now be made in detail to be present preferred embodiment of the invention, an example of which is illustrated in the accompanying drawing.

DETAILED DESCRIPTION OF THE INVENTION

A towing assembly 10 in accordance with the teachings of the present invention is provided to facilitate the towing of a smaller vehicle 12, such as an automobile, behind a heavy-duty vehicle 14, such as a motor home or bus. The towing assembly 10 provides increased sturdiness in its function of towing a vehicle 12 and significantly eases the lifting of the towed vehicle for transportation.

The enhanced sturdiness for towing as compared to prior art designs is achieved as a result of the provision of a mounting member 16 and its configuration and functional position in being fixed to the frame F of the towing vehicle 14. The mounting member 16 is the only component of the towing assembly 10 that is located underneath the towing vehicle 14. Since no part of the mounting member 16 is movable, the towing assembly 10 presents a novel construction wherein there is no movable component underneath the towing vehicle 14.

Figure 5:
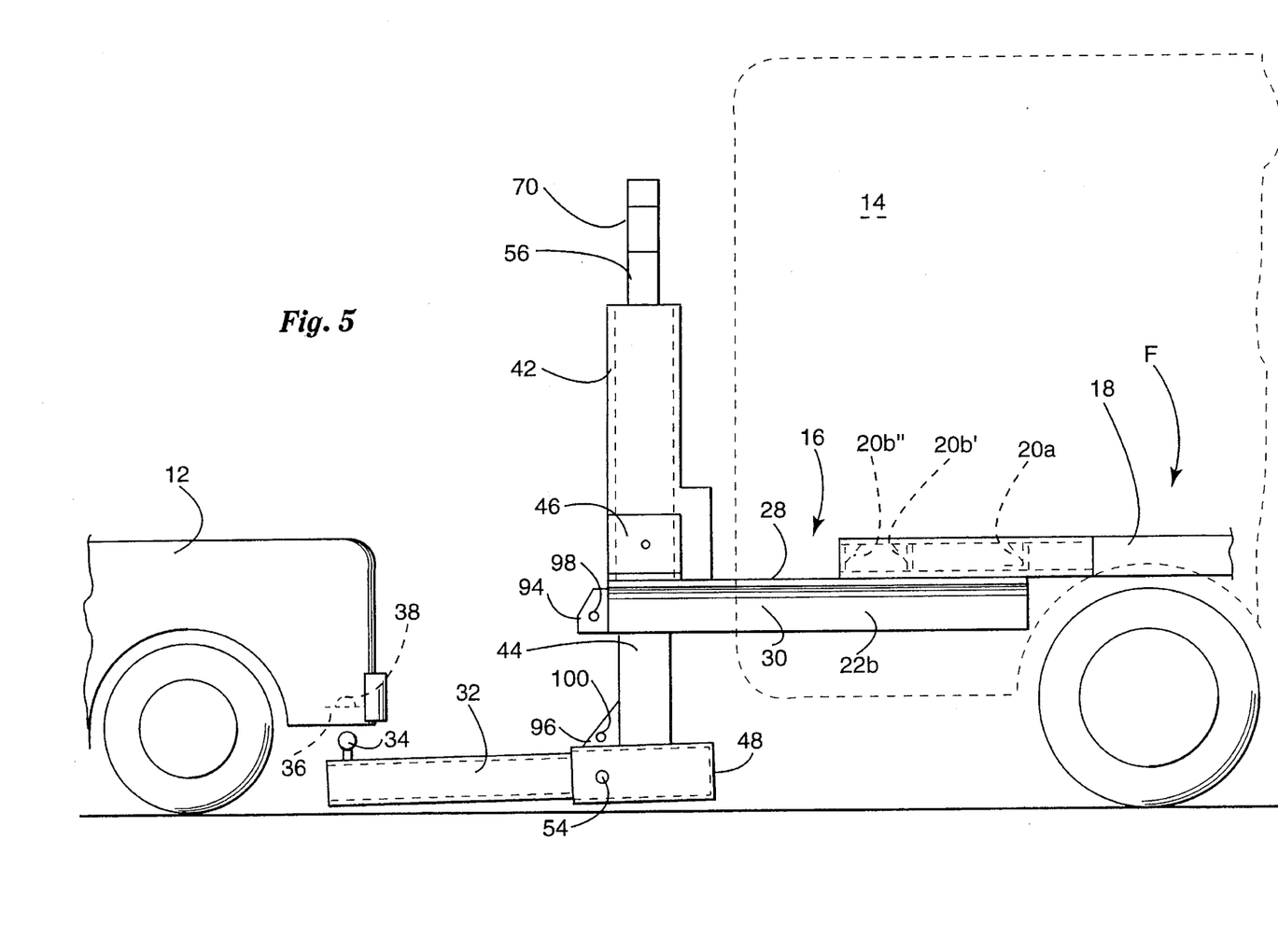
FIG. 5 is a side view of the inventive towing assembly in use prior to lifting of a towed vehicle.
Figure 6:
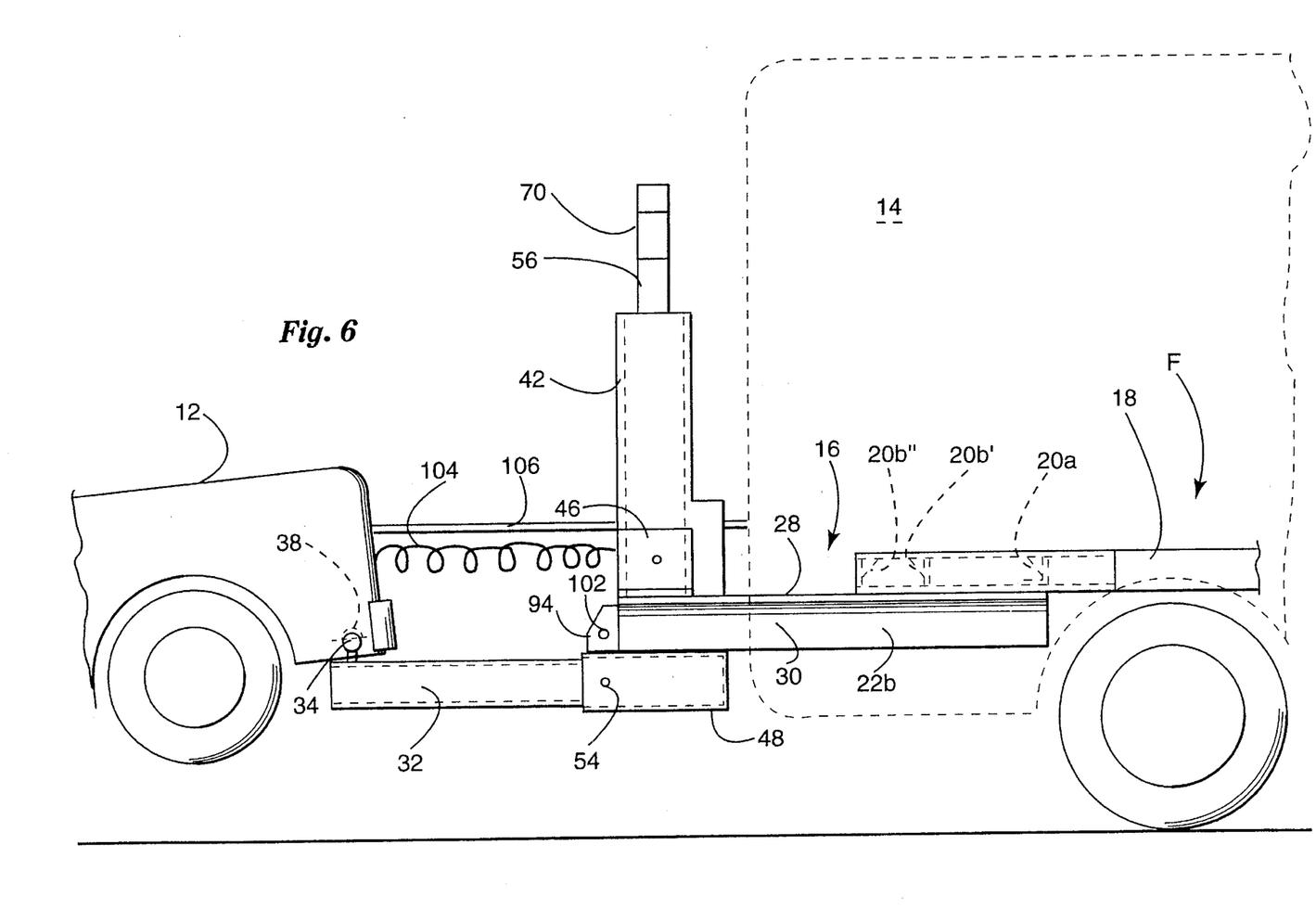
FIG. 6 is a side view of the inventive towing assembly in use after the lifting of the towed vehicle for towing.

The frame F of the towing vehicle 14 is generally defined by opposing channels (see identification numerals 18 in FIGS. 1, 5 and 6) on opposite sides of the vehicle. The mounting member 16 comprises structural elements that advantageously span the lateral distance between the opposing channels 18.

More particularly, the preferred embodiment of the invention incorporates a pair of cross bars 20a, 20b in spaced relation. The cross bars 20a, 20b act to support the weight of the towed vehicle 12 through the other components of the towing assembly 10 in balanced fashion across the entire lateral dimension of the towing vehicle 14.

Figures 1, 7:
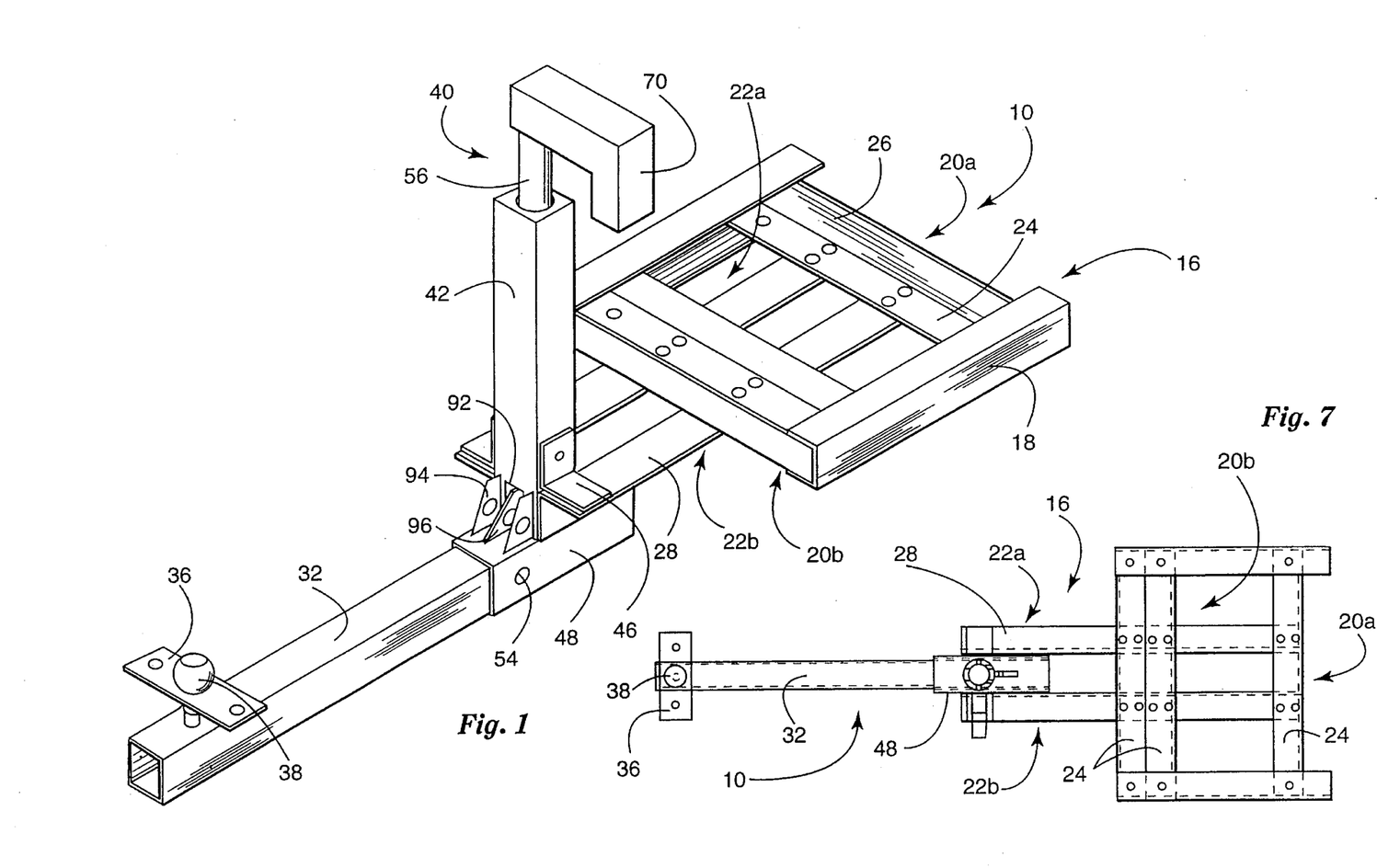
FIG. 1 is a perspective view of the inventive towing assembly.
FIG. 7 is a top view of the inventive towing assembly.
Figure 2A:
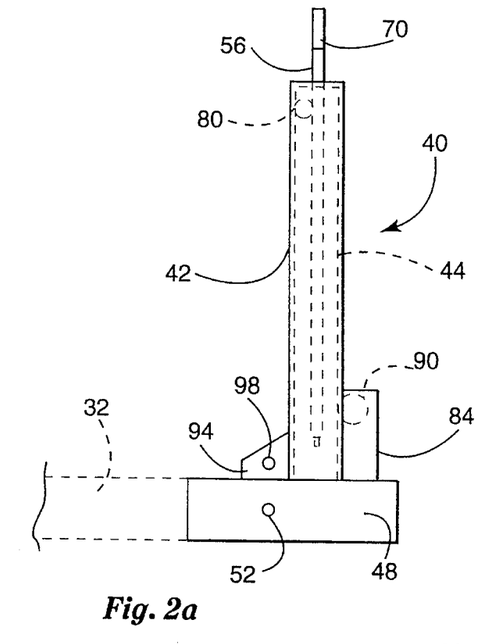
FIG. 2a is a side view of the motion assembly with the second vertical tube in the retracted position.
Figure 2B:
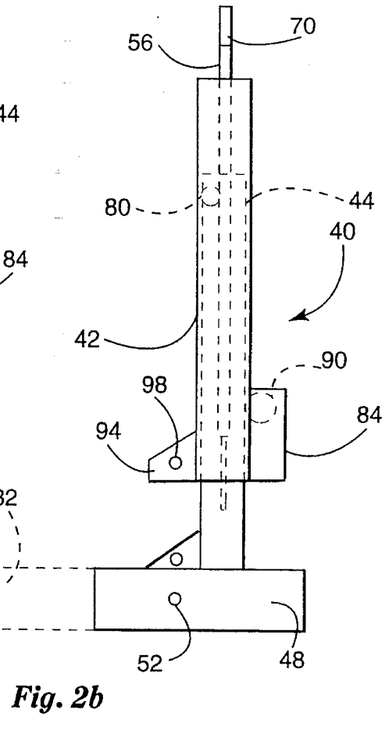
FIG. 2b is a side view of the motion assembly with the second vertical tube in the extended position.
Figure 3A:
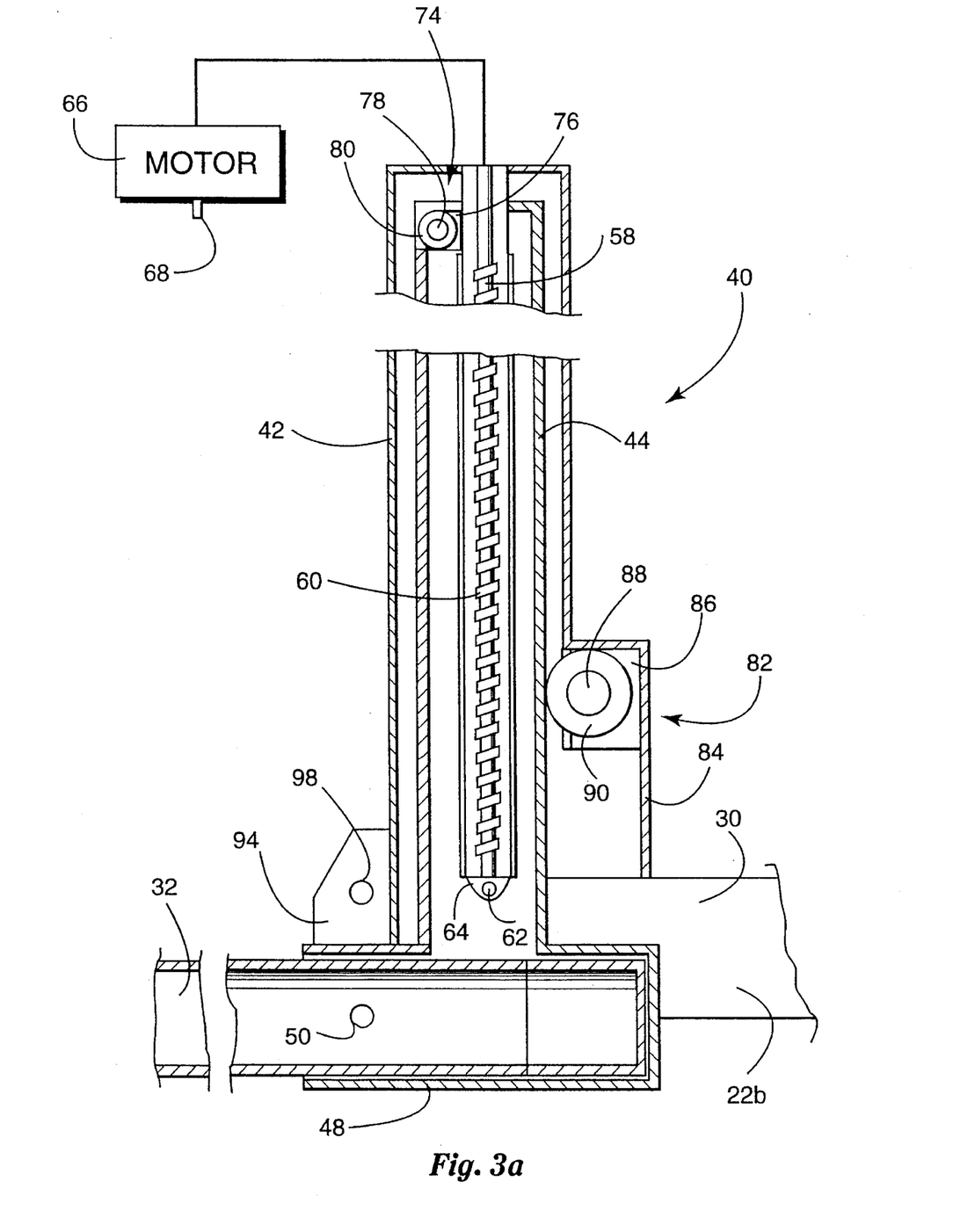
FIG. 3a is an enlarged side view of the motion assembly partially broken away and partially in schematic, showing the screw actuator in the retracted position.
Figure 3B:
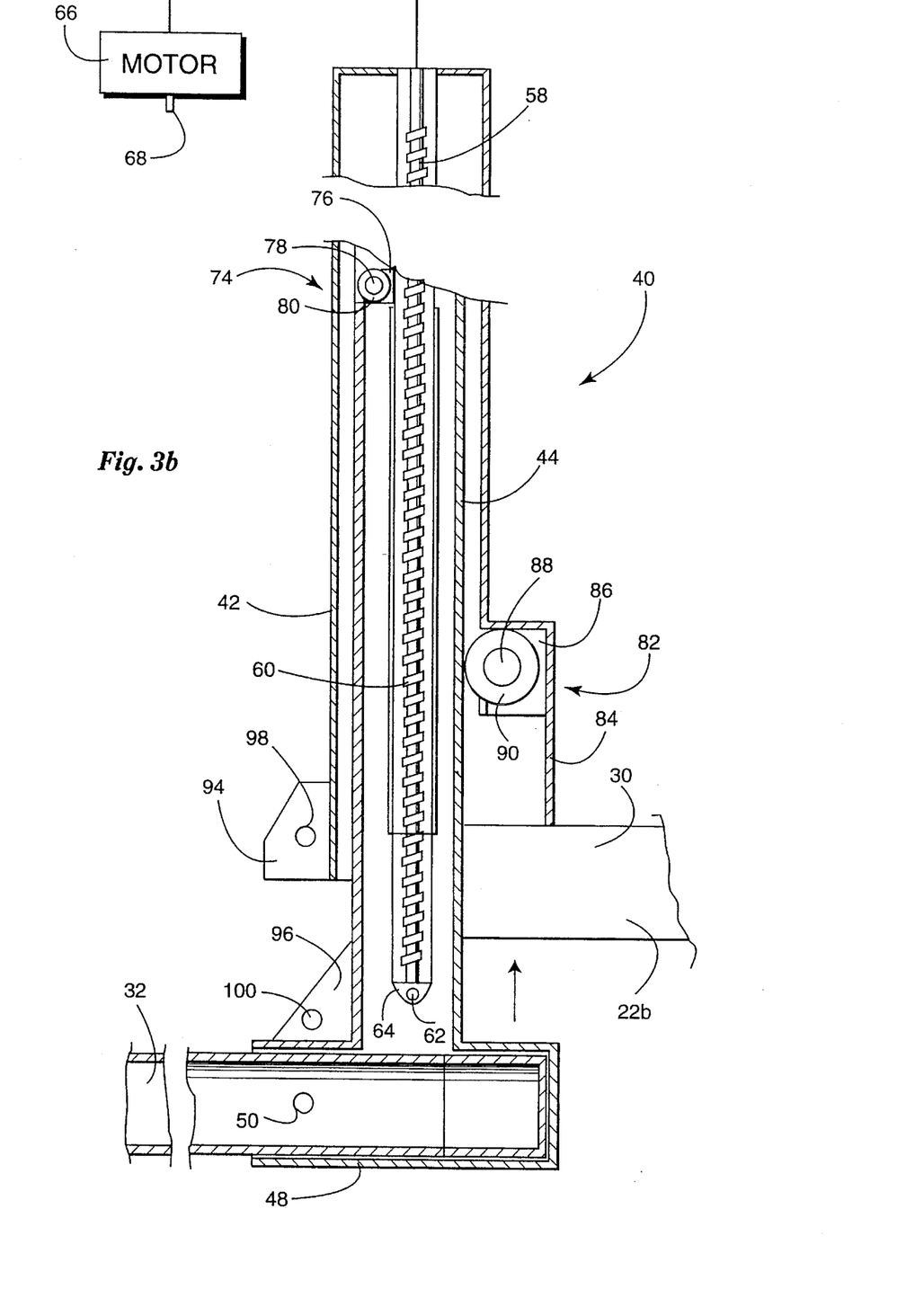
FIG. 3b is an enlarged side view of the motion assembly partially broken away and partially in schematic, showing the screw actuator in the extended position.

In the particular preferred embodiment of the invention, and using the conventional orientation of the towing vehicle 14 as reference, the cross bar 20b is situated most closely to the rear of the towing vehicle and comprises two contiguous members 20b', 20b" (see FIG. 7). The inclusion of the contiguous members 20b', 20b" to form the rearmost cross bar 20b gives the mounting member 16 greater supporting capability for the other components of the inventive towing assembly 10 as it lifts and carries the towed vehicle 12.

The mounting member 16 further comprises a pair of support bars 22a, 22b in spaced relation. The support bars 22a, 22b are attached at their proximal ends, as by bolting or welding, to the cross bars 20a, 20b and extend perpendicularly and rearwardly to a position just beyond the back end of the towing vehicle 14. The distal ends of the support bars 22a, 22b define the mounting site for adjacent components of the towing assembly 10 as will be further described below. The support bars 22a, 22b are laterally positioned and in such spaced relation that a center line drawn between them bisects the cross bars 20a, 20b. With this configuration, the adjacent components of the towing assembly 10 are centrally mounted so that the towed vehicle 12 is lifted and carried in balanced fashion.

The cross bars 20a, 20b and the support bars 22a, 22b are all preferably in the form of an angle iron. Accordingly, the cross bars 20a, 20b are each defined by a horizontal leg 24 and a vertical leg 26. Likewise, the support bars 22a, 22b are defined by a horizontal leg 28 and a vertical leg 30. As is illustrated in the drawing figures, the horizontal legs 24 and 28 of the cross bars 20a, 20b and the support bars 22a, 22b, respectively, are secured together.

The flat-to-flat engagement between the cross bars 20a, 20b and support bars 22a, 22b allows for greater attachment security for assured functioning of the mounting member 16. It can be readily recognized that with this design configuration, the vertical legs 30 of the support bars 22a, 22b extend downwardly in relation to the frame F of the towing vehicle 14.

The inventive towing assembly 10 directly supports the towed vehicle 12 with a load bar 32. In the preferred embodiment of the invention, a proximal end of the load bar 32 is formed with a ball 34 that cooperates with a socket associated with the towed vehicle 12 to create a hitch-like connection upon engagement for lifting and towing. The distal end of the load bar 32 cooperates with other components of the towing assembly as is later described.

It is contemplated that a plate 36 formed with a downwardly facing receiving socket 38 is fixed to the chassis of the towed vehicle 12 at the end thereof selected to be lifted for towing. In order to achieve and maintain proper balance, the plate 36 is positioned so that the receiving socket 38 is centrally located relative to the lateral dimension of the towed vehicle 12. With this design, the lifting and towing operation performed by the inventive towing assembly is stabilized.

In a key aspect of the invention and in order to accomplish the lifting of the towed vehicle 12 in preparation for towing, the towing assembly 10 includes a motion assembly 40. In a departure from the prior art, the motion assembly 40 operates to lift the load bar 32 with uniform vertical translation rather than angular motion in an arc as with presently known designs. The inventive design optimizes the applied force required to execute the lifting of the towed vehicle 12.

The motion assembly 40 preferably comprises concentric vertical tubes 42, 44 that telescope relative to one another. In the preferred design, the vertical tube 42 is spatially fixed and coupled to the mounting member 16 as is described below. The second vertical tube 44 is preferably received within, and vertically translates with respect to, the first tube 42.

The first vertical tube 42 is mounted between the vertical legs 30 of the support bars 22a, 22b. More particularly, the first tube 42 extends to a position between the vertical legs 30 of the support bars 22a, 22b. Mounting plates 46 (also in the form of angle irons) couple the first tube 42 to and between the support bars 22a, 22b. As a result of this mounting configuration, the first vertical tube 42 is held rigidly and securely in place.

The vertical translation associated with the motion assembly 40 results from the telescoping movement of the second vertical tube 44 within the first vertical tube 42. The vertical translation of the second vertical tube 44 promotes the lifting of towed vehicle 12 through the integral attachment of a horizontal tube 48 at the lower end of the second tube. It can be visualized that the horizontal tube 48 moves up and down in conjunction with the second tube 44 as it moves vertically within the first tube 42.

The load bar 32 is telescopingly received and secured within the horizontal tube 48. The load bar 32 is preferably formed with opposing aligned holes 50 that cooperate for securement with opposing aligned apertures, 52 formed in the horizontal tube 48. In assembling the inventive towing assembly 10 for operation, the load bar 32 is inserted into the horizontal tube 48 until holes 50 and apertures 52 are in registration. A securing pin 54 is extended through the registered holes 50 and apertures 54 to secure the load bar 32 in place. As a result, the vertical translation of the second tube 44 creates the ability to lift the towed vehicle 12 in preparation for towing.

In a key aspect of the invention, the vertical translation associated with the motion assembly 40 is preferably created by a linear screw actuator 56. The actuator 56 is typically constructed to operate through the use of a threaded shaft 58 that cooperatively rotates within threaded tube 60. Since the shaft 58 is spatially fixed, as it rotates, the screw engagement between the threads of the shaft and the threads of the tube 60 cause the tube to translate in an axial direction. The actuator 56 is inserted within the second vertical tube 44 and cooperates therewith through the engagement of a pin 62 on the inner surface of the second tube that extends through a clevis 64 integral with the translating tube 60 of the screw actuator 56.

It can be visualized that the direction of angular rotation of the threaded shaft 58 determines the axial direction of the threaded tube 60. More particularly, the threaded tube 60 and thus the second vertical tube 44 is selectively raised and lowered in response to the direction of rotation of the shaft 58.

While the screw actuator 56 can be manually operated through a crank handle, the present invention contemplates that the screw actuator be driven by a prime mover, such as a motor 66. A toggle switch 68 is conveniently located on the motor housing 70 so as to energize the motor 66 in forward and reverse directions. It can thus be recognized that the direction in which the motor 66 is switched to operate characterizes the upward or downward movement of the screw actuator 56.

The screw actuator 56 is most desirably purchased as an individual component from a commercial vendor. It has been determined that screw actuators made and sold by Burr Engineering and Development Corporation of Battle Creek, Mich., are well-suited for incorporation in the inventive towing assembly 10.

Figure 4:
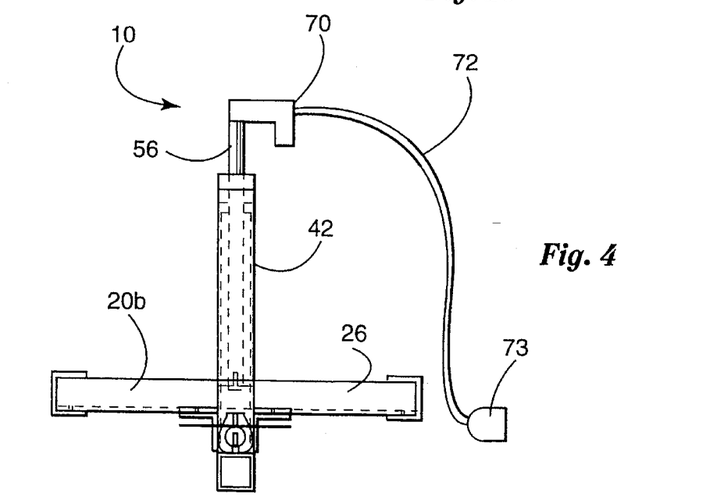
FIG. 4 is a back view of the motion assembly of the invention, showing the remote switch feature.

As shown in FIG. 4, the inventive assembly 10 also preferably contemplates the use of a remote switch to energize the motor 66 of the screw actuator 56. The remote switch may take the form of a cord 72 with forward and reverse control buttons in a handle 73. The remote switch allows a user to operate the screw actuator from a safe distance for both convenience and safety.

To facilitate the uniform vertical translation of the second vertical tube 44 within the first vertical tube 42, the motion assembly 40 preferably includes a pair of roller assemblies that cooperatively promote relative movement between the first tube and second tube. A first roller assembly 74 is mounted to the top end of the second tube 44. More particularly, a first bearing bracket 76 is attached to opposing sides of the second tube 44 and supports a first roller shaft 78 for relative rotation. A first roller 80 is mounted on the first roller shaft 78, with its circumferential surface in contact with the inner surface of the first tube 42.

A second roller assembly 82 is mounted to the first tube 42. More specifically, the roller assembly 82 is set inside an extension housing 84 that forms an integral part of the first tube 42. A second bearing bracket 86 is fixed to the extension housing 84. A second roller shaft 88 is received within the bearing bracket 86 for relative rotation. A second roller 90 is mounted on the shaft 88 and engages the outer surface of the second tube 44. Together with the first roller assembly 74, the second roller assembly 82 assists in the controlled vertical translation of the second tube 44.

In the preferred embodiment of the inventive assembly 10, the first roller assembly 74 and the second roller assembly 82 are offset from one another in both a vertical plane and a horizontal plane. Thus, the engagement between the first roller 80 and the inside surface of the first tube 42 and the engagement of the second roller 90 against the outside surface of the second tube 44 act to maintain the translating second tube centrally within the first tube.

The structural configuration of the inventive towing assembly 10 makes for ready understanding of the operation of the invention. At times other than when the towing vehicle 74 is being used for towing operation, the components of the motion assembly 40 are in their home position. More particularly, the second tube 44 is completely retracted within the first tube 42 so that the horizontal tube 48 is raised to a position between the vertical legs 30 of the support bars 22a, 22b. To accommodate full retraction of the second tube 44 and further provide for locking security, the first tube 42 is formed with a slot 92 extending upwardly from its bottom edge and between a pair of extension flanges 94. The slot 92 is positioned to receive an angle plate 96 that is formed on, and bridges, the second tube 44 and the horizontal tube 48. The extension flanges 94 have aligned holes 98 and the angle plate 96 has an aperture 100. When the second tube 44 is fully retracted, the holes 98 and aperture 100 come into registration, allowing a locking pin 102 to be inserted to ensure the second tube remains in the retracted position.

When the towing operation is desired, the motor 66 that drives the screw actuator 56 is energized so as to lower the second tube 44 and attached horizontal tube 48. The horizontal tube 48 is lowered to a low enough position so that when the load bar 32 is received in preparation for towing, the load bar is positioned to extend beneath the towed vehicle 12. The securing pin 54 is inserted through the holes 50 and the apertures 52 to secure the load bar 32 and horizontal tube 48 together.

The towed vehicle 12 is positioned above the load bar 32 so that the ball 34 aligns with the receiving socket 38 in the plate 36 mounted to the chassis of the towed vehicle. The motor 66 of the motion assembly 40 is then energized in a reverse direction to cause the second tube 44 and horizontal tube 48 to be elevated. The load bar 32 elevates in conjunction with this action so that the ball 34 comes into engagement with the receiving socket 38. Upon continued upward motion of the motion assembly 40, the towed vehicle 12 is lifted off the ground and readied for towing. The engagement of the threads between the shaft 58 and tube 60 of the screw actuator 56, in combination with the rigid security provided by the mounting member 16 in coupling to the motion assembly 40, keeps the towed vehicle 12 in the necessary elevated position during towing. Security chains 104 may be connected, preferably to the fenders, of the respective vehicles 12 and 14 to provide a backup safeguard against separation. Finally, the circuit cable 106 promoting operation of the brake lights of the towed vehicle 12 through the electric circuit of the towing vehicle 14 is connected.

The process described above is reversed when unloading the towed vehicle 12. More specifically, the motor 66 of the motion assembly 40 is energized to lower the second tube 44 that is carrying the load bar 32. Continued lowering of the second tube 44 causes the vehicle 12 to drop gradually and engage the surface of the ground. Further lowering disengages the ball 34 on the load bar 32 from the receiving socket 38 in the plate 36 of the vehicle. The load bar 32 may then be removed from the horizontal tube 48 and placed in a storage location until needed again for towing. The towing vehicle 14 and the towed vehicle 12 are both then available for independent use as desired.

In summary, numerous benefits result from application and use of the teachings of the present invention. The motion assembly 40 generates uniform vertical translation which in turn is utilized to lift the towed vehicle 12 in preparation for towing. The mounting member 16 is rigidly fixed to the frame of the towing vehicle 14 to provide stable support and eliminate movable components from beneath the towing vehicle 14. The powered screw actuator 56 of the motion assembly 40 allows for easy and efficient operation in raising and lowering the towed vehicle 12. Finally, the motor 66 of the screw actuator 56 may be energized from a remote location to promote convenience and safety in operating the motion assembly 40.

The foregoing description of a preferred embodiment of the invention has been presented for purposes of illustration and invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A towing assembly, comprising:
   a mounting member for attachment to an underside of a frame of a first vehicle;
   a motion assembly coupled to said mounting member for linear vertical translation; and
   a load bar associated with said motion assembly and for supporting a second vehicle,
   whereby said linear vertical translation of said motion assembly raises said said second vehicle for towing by first vehicle.

2. The towing assembly as in claim 1, wherein said mounting member comprises:
   a cross bar fixed to said frame of said first vehicle; and
   a support bar fixed at a proximal end in perpendicular relation to said cross bar and coupled at a distal end to said motion assembly.

3. The towing assembly as in claim 2, wherein is included two support bars in spaced relation and said motion assembly is coupled to and between said support bars.

4. The towing assembly as in claim 3, wherein said support bars are each defined by a horizontal leg and a vertical leg and said motion assembly is coupled to said vertical legs of said support bars.

5. The towing assembly as in claim 4, wherein said horizontal legs of said support bars are fixed to said cross bar.

6. The towing assembly as in claim 2, wherein is included two cross bars in spaced relation.

7. The towing assembly as in claim 6, wherein said cross bars are each defined by a horizontal leg and a vertical leg.

8. The towing assembly as in claim 7, wherein said support bar is fixed to said horizontal legs of said cross bars.

9. The towing assembly as in claim 1, wherein said motion assembly comprises:

a first vertical tube coupled to said mounting member;

a second vertical tube associated with said first vertical tube for linear vertical translation; and a roller assembly to facilitate said linear vertical translation of said second vertical tube relative to said first vertical tube.

10. The towing assembly as in claim 9, wherein said motion assembly further comprises a horizontal tube fixed to said second vertical tube so as to linearly vertically translate with said second vertical tube.

11. The towing assembly as in claim 9, wherein is included a first roller assembly coupled to said first vertical tube and a second roller assembly coupled to said second vertical tube.

12. The towing assembly as in claim 11, wherein said first and second roller assemblies are offset from one another in a vertical plane.

13. The towing assembly as in claim 11, wherein said first and second roller assemblies are offset from one another in a horizontal plane.

14. The towing assembly as in claim 11, wherein said first and second roller assemblies are offset from one another both in a horizontal plane and a vertical plane.

15. The towing assembly as in claim 9, wherein is further included means for selectively locking said first and second vertical tubes against relative movement.

16. The towing assembly as in claim 1, wherein said motion assembly is operated by powered means.

17. The towing assembly as in claim 1, wherein said motion assembly comprises a screw actuator.

18. The towing assembly as in claim 1, wherein said motion assembly comprises a screw actuator driven by a prime mover.

19. The towing assembly as in claim 18, wherein said prime mover is energized from a remote location.

* * * * *